United States Patent [19]

Ishii

[11] Patent Number: 5,615,183
[45] Date of Patent: Mar. 25, 1997

[54] MAGNETIC HEAD USED IN MAGNETOOPTICAL RECORDING

[75] Inventor: Kazuyoshi Ishii, Tokyo, Japan

[73] Assignee: Canon Kabushiki Kaisha, Tokyo, Japan

[21] Appl. No.: 567,409

[22] Filed: Dec. 5, 1995

Related U.S. Application Data

[63] Continuation of Ser. No. 224,721, Apr. 8, 1994, abandoned.

[30] Foreign Application Priority Data

Apr. 14, 1993 [JP] Japan .................................. 5-109827

[51] Int. Cl.$^6$ ................................................ G11B 13/00
[52] U.S. Cl. .................................. 369/13; 360/114
[58] Field of Search ....................... 369/13, 14; 360/114, 360/59, 102, 103, 122, 123; 365/122

[56] References Cited

U.S. PATENT DOCUMENTS

| | | | |
|---|---|---|---|
| 4,870,521 | 9/1989 | Okabayashi | 360/103 |
| 5,233,492 | 8/1993 | Iwata et al. | 360/103 |
| 5,260,845 | 11/1993 | Takayama et al. | 360/103 |
| 5,270,888 | 12/1993 | Collisson et al. | 360/103 |
| 5,313,444 | 5/1994 | Ishii et al. | 369/13 |

FOREIGN PATENT DOCUMENTS

| | | |
|---|---|---|
| 0433021 | 6/1991 | European Pat. Off. . |
| 4-116905 | 4/1992 | Japan . |
| 04181507 | 6/1992 | Japan . |
| 5182112 | 7/1993 | Japan ...................................... 369/13 |

OTHER PUBLICATIONS

Nakao, et al., "High Speed Overwritable Magneto–Optic Recording," Japanese Jour. App. Phys., vol. 26, No. 26–4, Apr. 1987, pp. 149 through 154.

Abstract and drawings of Japanese patent document 4–119503, Derwent Database WPI, Section Ch, Week 9222, Apr. 1992.

PCT/FR90/00386, Magnetic Field Modulation Control Circuit For Recording a Magneto–Optic Memory, 13 Dec. 1990.

Primary Examiner—Tan Dinh
Attorney, Agent, or Firm—Fitzpatrick, Cella, Harper & Scinto

[57] ABSTRACT

A magnetic head includes a substrate, a magnetic pole formed on the substrate and a two-layered magnetic field generation coil. A conductive wire is sequentially wound around a core sandwiched between regulating members from its middle portion from the inner periphery side toward the outer periphery side while the two end portions of the conductive wire are simultaneously rotated in opposite directions, so that the two-layered magnetic field generation coil is provided.

12 Claims, 11 Drawing Sheets

MAGNETIC HEAD USED IN MAGNETOOPTICAL RECORDING

This application is a continuation of prior application Ser. No. 08/224,721 filed Apr. 8, 1994, now abandoned.

BACKGROUND OF THE INVENTION

1. Field of the Invention

The present invention mainly relates to a winding method of a low-profile spiral coil for a magnetic head used in, e.g., a magnetooptical recording apparatus which adopts a magnetic field modulation system.

2. Related Background Art

A magnetic field modulation system is known as a magnetooptical recording apparatus for recording information at high density on a magnetooptical recording medium such as a magnetooptical disk. In this system, a laser beam is converged to a spot size of about 5 µm, and is radiated onto a recording medium. At the same time, a magnetic head applies a magnetic field modulated in accordance with an information signal onto the portion irradiated with the laser beam, thereby recording the information signal.

Figure 1:
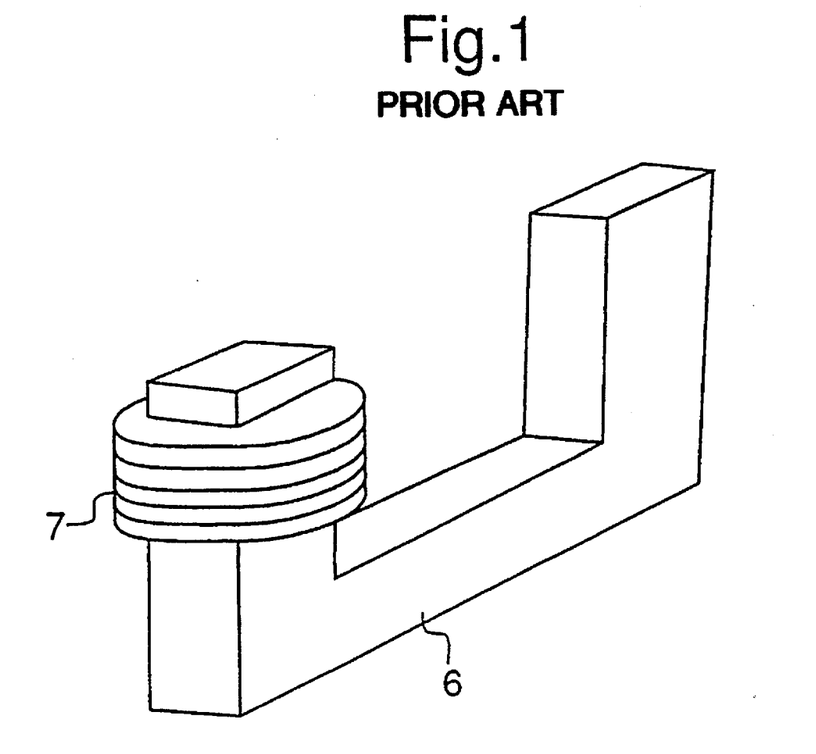
FIG. 1 is a perspective view showing the outer appearance of a conventional magnetic head.

In a conventional magnetooptical recording apparatus of the magnetic field modulation system, a magnetic head having an arrangement shown in FIG. 1 is used. Referring to FIG. 1, the magnetic head comprises a magnetic member 6 consisting of a magnetic material such as Mn-Zn ferrite having a high magnetic permeability, and a coil 7 constituted by winding a conductive wire (magnet wire) with an insulating coat, which wire has a diameter of 40 to 70 µm, around the magnetic pole of the magnetic member 6.

In recent years, in order to meet a requirement for a high information signal recording speed, the frequency of a recording signal tends to be set to be high. When a magnetic field is modulated at such a high frequency, the magnetic head is required to have characteristics including a low inductance and a low high-frequency resistance.

Thus, the present inventor has already proposed a magnetic head in which a coil obtained by two-dimensionally winding a magnet wire is mounted onto a substrate consisting of a magnetic material, as a head which has good productivity in addition to desired characteristics including a low inductance and low high-frequency resistance (Japanese Laid-Open Patent Application No. 4-181507).

Figure 2:
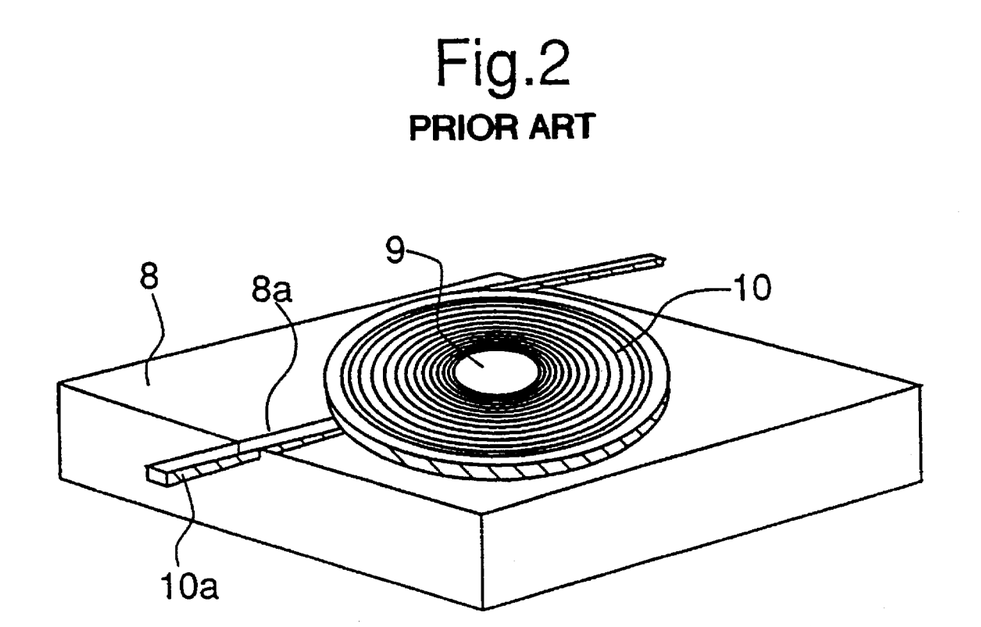
FIG. 2 is a perspective view showing a coil winding state of another conventional magnetic head.

FIG. 2 is a perspective view of such a magnetic head. The magnetic head comprises a substrate 8 consisting of a magnetic material such as Mn-Zn ferrite having a high magnetic permeability, and a magnetic pole 9 also consisting of a magnetic material such as Mn-Zn ferrite having a high magnetic permeability. Note that a coil 10 is constituted by two-dimensionally winding a magnet wire around the magnetic pole 9. A groove 8a extending outwardly from the winding center of the coil 10 is formed on the substrate 8, and receives a lead wire portion 10a of the coil, so that the lead wire is led outside the magnetic head. As described above, since the coil is two-dimensionally wound, the inductance and the high-frequency resistance of the magnetic head can be sufficiently lowered. Also, since the lead wire portion of the coil is stored in the groove formed not on the upper surface of the coil but on the substrate, and is led outside the magnetic head, the coil can be set sufficiently close to a recording medium. For this reason, high magnetic field generation efficiency can be obtained.

As described above, in the conventional magnetic head, since the lead wire portion of the coil is stored in the groove formed on the substrate, and is led outside the magnetic head, the coil can be realized by two-dimensionally winding the magnet wire around the magnetic pole. However, since this magnetic head requires a process of forming the groove on the substrate, and also requires a process of storing the lead wire portion of the coil in the groove, sufficiently good productivity cannot be obtained yet. In particular, when a magnet wire having a smaller wire diameter is used to efficiently generate a magnetic field, the above-mentioned groove formation process, lead wire storage process, and the like become more difficult.

SUMMARY OF THE INVENTION

The present invention has been made in consideration of the above situation, and has as its object to provide a coil winding method for a magnetic head, which method is improved to realize a magnetic head having a low inductance and a low high-frequency resistance while maintaining high productivity, and the magnetic head.

In order to achieve the above object, the present invention is characterized in that a conductive wire is sequentially wound around a core member sandwiched between regulating members from its middle portion from the inner periphery side toward the outer periphery side while the two end portions of the conductive wire are simultaneously rotated in opposite directions, thereby constituting a two-layered coil.

Also, the present invention is characterized in that a plurality of conductive wires are sequentially wound around a core member from their middle portions from the inner periphery side toward the outer periphery side while the two end portions of the conductive wires are simultaneously rotated in opposite directions, thereby constituting a multi-layered coil (the number of layers corresponds to an integer multiple of 2).

In this case, a coil member is manufactured by the above-mentioned coil winding method, and a magnetic head is constituted by arranging the coil member around a magnetic pole projecting from a substrate consisting of a magnetic material.

The magnetic head used in magnetooptical recording according to the present invention with the above-mentioned arrangement has a magnetic field generation two-layered coil or multi-layered coil (the number of layers corresponds to an integer multiple of 2).

DESCRIPTION OF THE PREFERRED EMBODIMENTS

The preferred embodiments of the present invention will be described in detail hereinafter. FIGS. 3A to 3D show an embodiment of a coil winding method according to the present invention. Referring to FIGS. 3A to 3D, a magnet wire to be wound to form a coil has end portions 2a and 2b. Regulating members 3a and 3b are used for preventing irregular winding and collapse upon winding of the coil. A core member 4 is sandwiched between the regulating members 3a and 3b, and constitutes a coil winding jig together with the regulating members 3a and 3b. Note that at least one of the regulating members 3a and 3b is detachable from the core member 4.

Figure 3A:
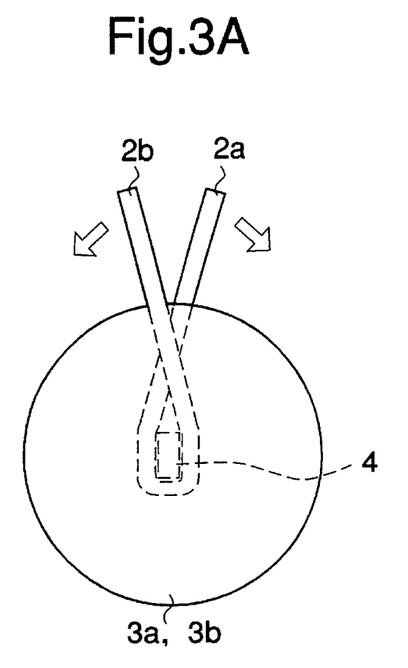
FIGS. 3A to 3D are views for explaining a coil winding method according to the present invention.
Figure 3B:
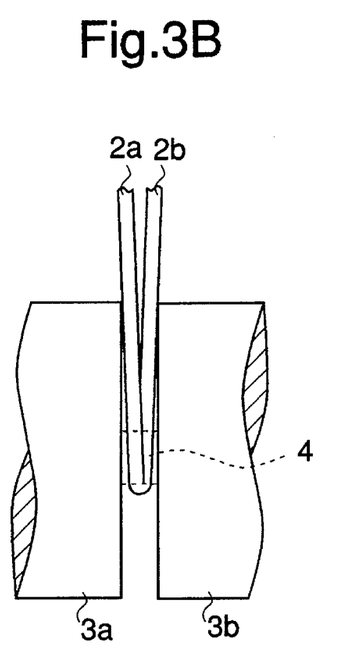

The coil winding method will be described below. FIGS. 3A and 3B respectively show a state viewed from the axial direction and a state viewed from the side surface at the beginning of winding of the coil. The middle portion of the magnet wire is looped around the core member 4, and the magnet wire is wound while simultaneously rotating its two end portions 2a and 2b in opposite directions. More specifically, in this embodiment, as indicated by arrows in FIG. 3A showing the state viewed from the axial direction of the core member 4, the end portion 2a is rotated clockwise, and the end portion 2b is rotated counterclockwise. Furthermore, when the two end portions 2a and 2b cross, they always pass predetermined sides. More specifically, in this embodiment, the interval between the regulating members 3a and 3b is determined to substantially coincide with a width twice the diameter of the magnet wire or a width corresponding to an integer multiple of 2 of the diameter of the magnet wire. The end portions 2a and 2b cross each other keeping to the left of the other. As a result, the magnet wire is sequentially wound from the inner periphery side toward the outer periphery side, and constitute a two-layered coil.

Figure 3C:
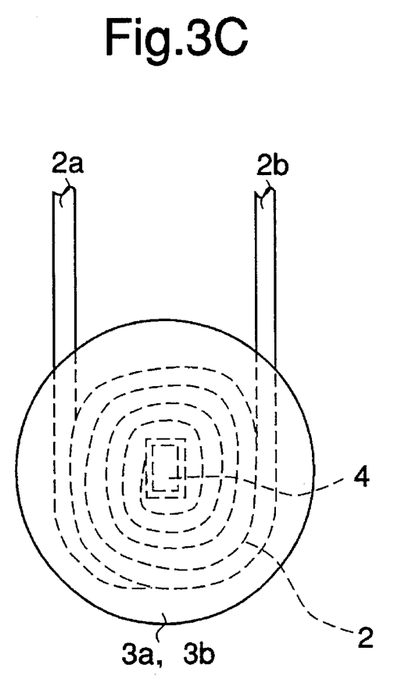
Figure 3D:
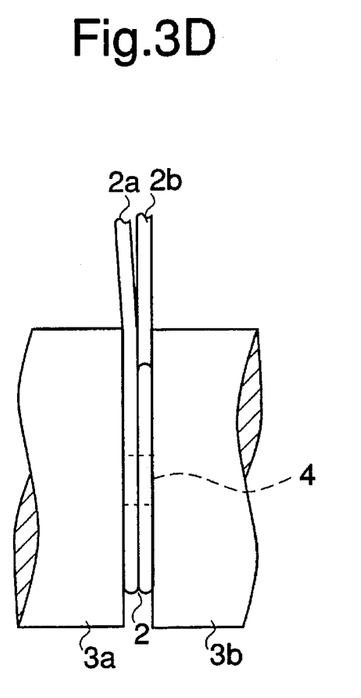

FIGS. 3C and 3D respectively show a state viewed from the axial direction and a state viewed from the side surface at the end of winding of the coil. The turn portions of a wound coil 2 are integrally hardened by a known means, i.e., by, for example, melting a self-bonding coat pre-formed on the surface of the magnet wire by an organic solvent or heat, or using another adhesive. Thereafter, the coil 2 is detached from the jig.

Figure 4A:
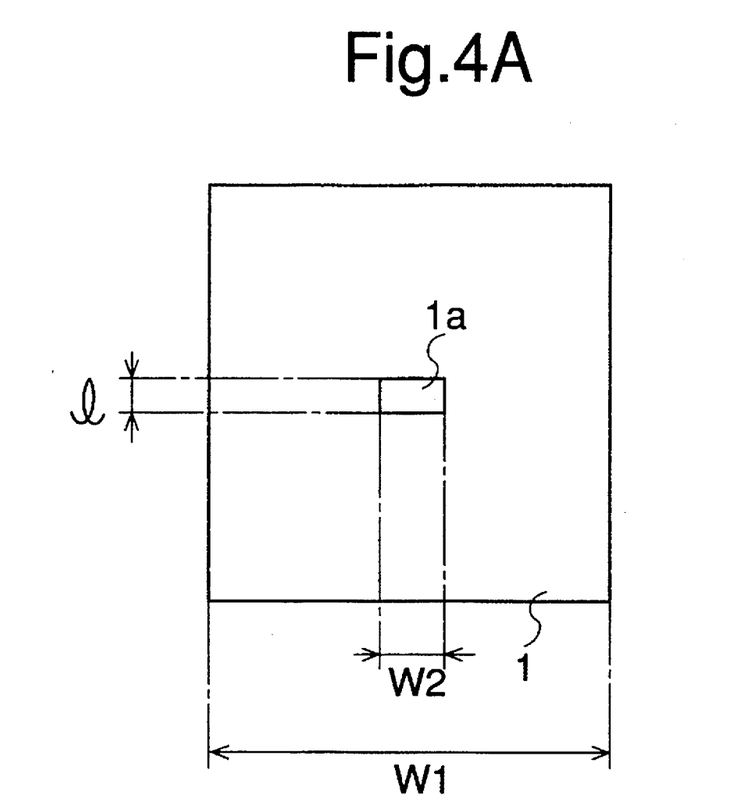
FIGS. 4A and 4B are views showing a substrate of a magnetic head according to the present invention.
Figure 4B:
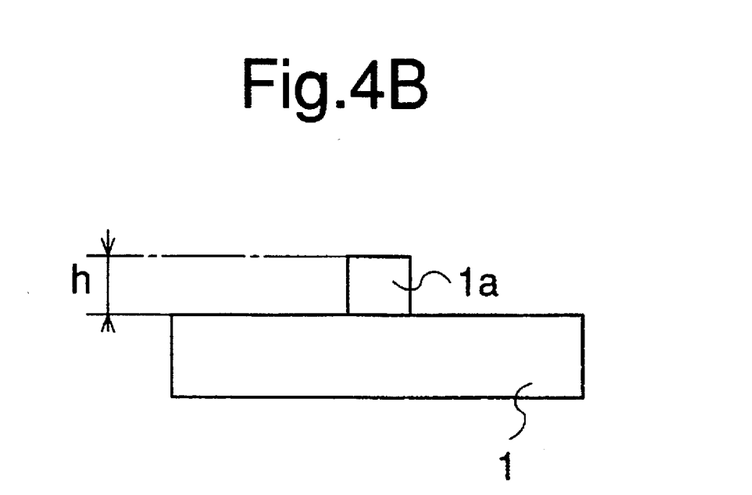

A magnetic head for magnetic field modulation magnetooptical recording, which head uses the coil member according to the present invention, will be described below. FIG. 4A is a plan view of the outer appearance of a core of the magnetic head, and FIG. 4B is a side view thereof. The magnetic member is constituted by a flat substrate 1 consisting of a magnetic material such as Mn-Zn ferrite having a high magnetic permeability, and a magnetic pole 1a projecting from the central portion of the substrate 1, and also consisting of a magnetic material such as Mn-Zn ferrite having a high magnetic permeability. For example, the substrate 1 has a square shape having one side with a width W1=1 to 3 mm, and the magnetic pole 1a has a length l=0.05 to 0.2 mm, a width W2=0.1 to 0.3 mm, and a height h=0.06 to 0.2 mm. The shape and size of the core are not limited to these. For example, the magnetic pole 1a may be formed into a columnar shape, a conical shape, or other shapes.

Figure 5A:
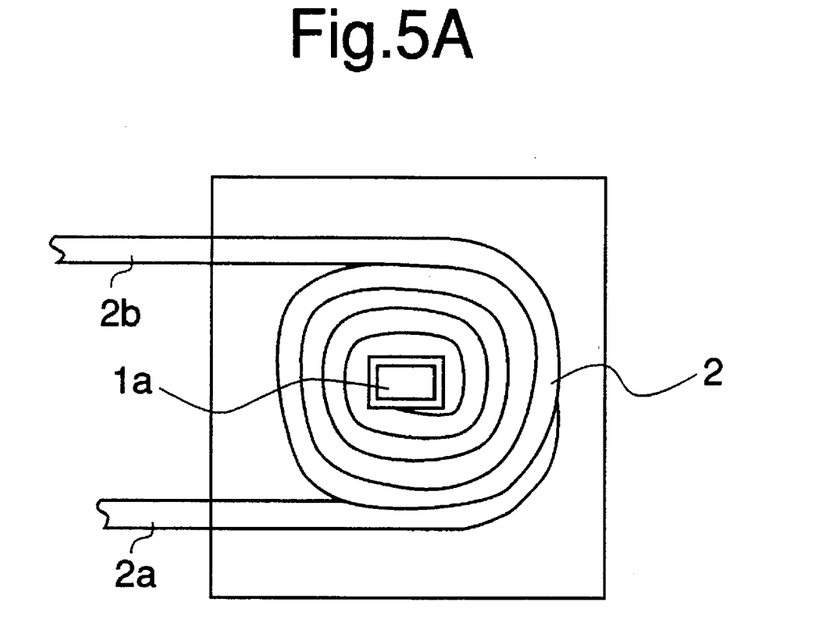
FIGS. 5A and 5B are views showing the outer appearance of the magnetic head according to the present invention.
Figure 5B:
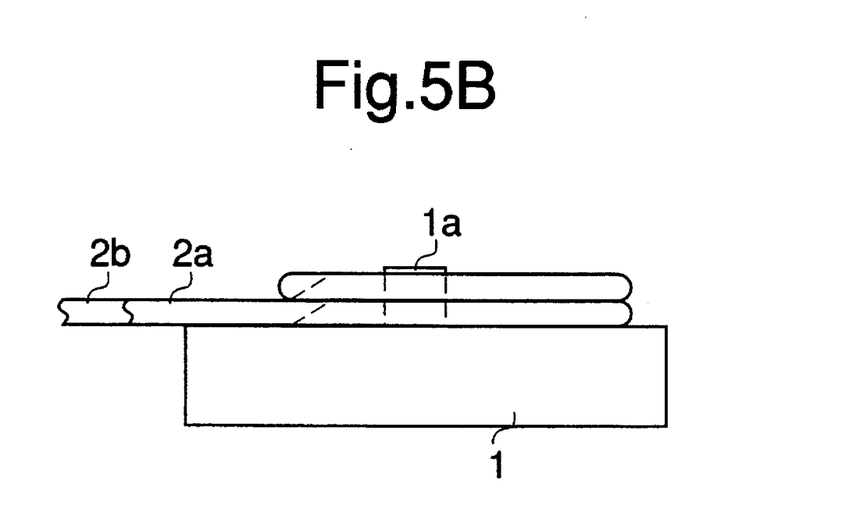

FIGS. 5A and 5B show the outer appearance of the magnetic head. FIG. 5A is a plan view of the magnetic head, and FIG. 5B is a side view thereof. The coil 2 is wound around the magnetic pole 1a on the substrate 1 by the above-mentioned coil winding method, and the turn portions of the coil 2 are adhered to each other to constitute a single coil member including a two-layered coil. Note that the wire diameter of the magnet wire constituting the coil 2 is 30 to 70 μm, and the number of turns is 20 to 30 (FIG. 5A illustrates a small number of turns for the sake of simplicity). As shown in FIG. 5B, it is desirable that the end of the magnetic pole 1a slightly project from the upper surface of the coil 2.

As shown in FIGS. 5A and 5B, the magnetic head using the coils manufactured by the coil winding method of the present invention does not require any groove for receiving a lead wire portion extending outwardly from the center of the winding of the coil unlike in the conventional magnetic head, and lead wire portions, i.e., the end portions 2a and 2b are led outside the magnetic head along the surface of the substrate 1 as a result of winding.

In the above-mentioned embodiment, FIGS. 3A to 3D show the method of winding a two-layered coil. As shown in FIGS. 6A to 6D showing a method of winding a four-layered coil, the winding method of the present invention can be applied to winding of a multi-layered coil (the number of layers corresponds to an integer multiple of 2). In the embodiment shown in FIGS. 6A to 6D, two magnet wires are used in winding of coils. In this embodiment, one magnet wire has end portions 21a and 21b, and the other magnet wire has end portions 22a and 22b. The same reference numerals in FIGS. 6A to 6D denote the same parts as in FIGS. 3A to 3D, and a detailed description thereof will be omitted.

Figure 6A:
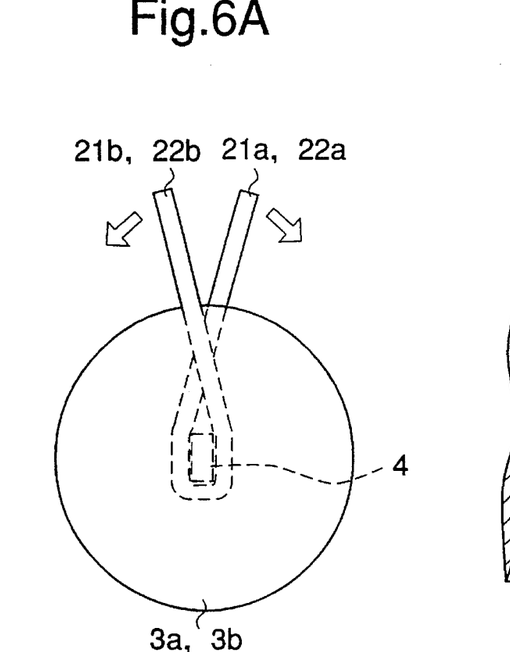
FIGS. 6A to 6D are views showing another embodiment of a coil winding method according to the present invention.
Figure 6B:
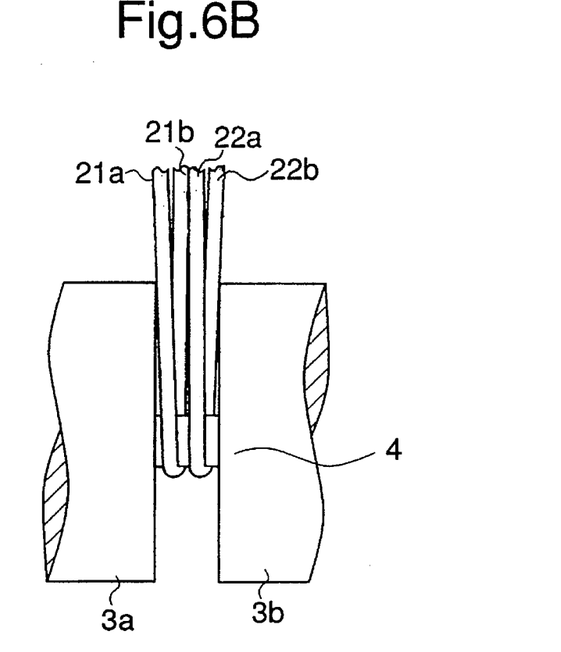

FIGS. 6A and 6B respectively show a state viewed from the axial direction and a state viewed from the side surface at the beginning of winding of the coil. The number of magnet wires to be looped around a core member 4 is 2. The middle portions of the magnet wires are looped around the core member 4, and the magnet wires are wound while simultaneously rotating their end portions 21a and 22a, and 21b and 22b in opposite directions. More specifically, in this embodiment, when viewed from the axial direction of the core member 4, as indicated by arrows, the end portions 21a and 22a are rotated clockwise, and the end portions 21b and 22b are rotated counterclockwise. Furthermore, when the end portions 21a, 21b, 22a, and 22b cross, they always pass predetermined sides. More specifically, in this embodiment, the end portions 21a, 21b, 22a, and 22b are arranged in turn from the left side in the axial direction of the core member 4. Note that the interval between the regulating members 3a and 3b is determined to substantially coincide with a width four times the diameter of each magnet wire.

In this manner, when the magnet wires are sequentially wound around the core member 4 from the inner periphery side toward the outer periphery side, two-layered coils 21 and 22 (a total of four layers) are wound.

Figures 6C, 6D:
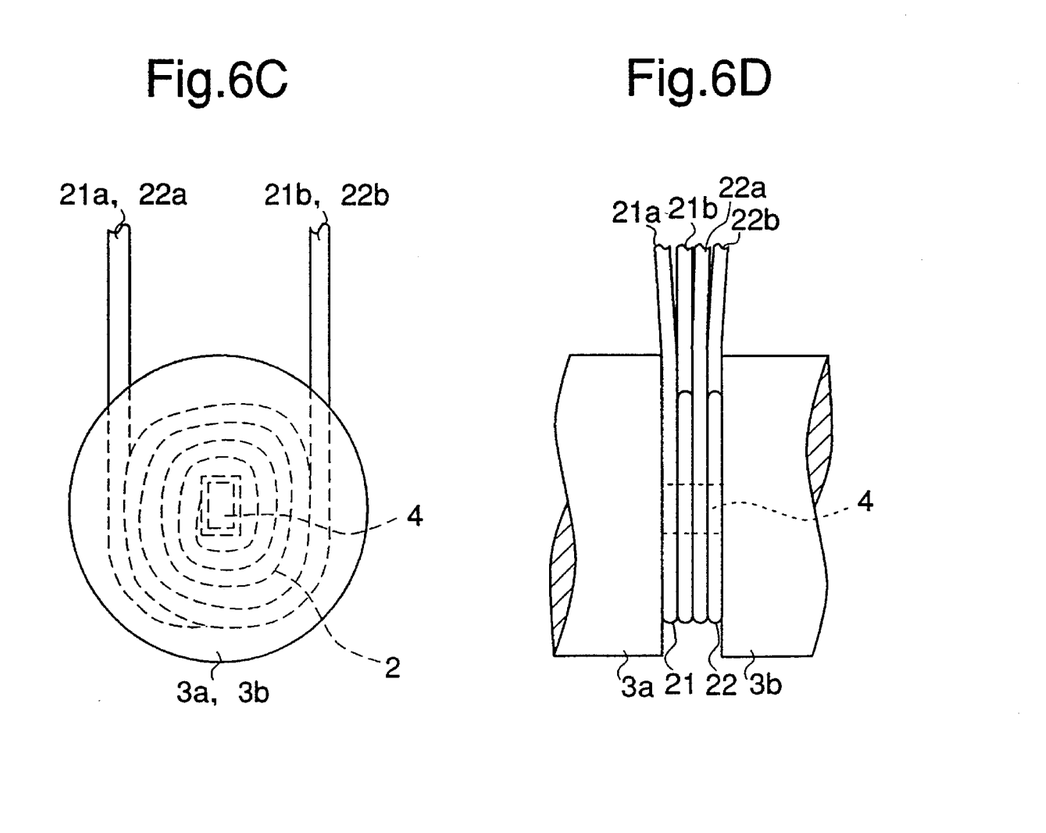

FIGS. 6C and 6D respectively show a state viewed from the axial direction and a state viewed from the side surface at the end of winding of the coils 21 and 22. The wound coils 21 and 22 are hardened by a known means in the same manner as in the above embodiment to integrate two coils, thereby constituting a single four-layered coil. The coil is then detached from the jig. In the use of a coil member, the two coils may be connected in series or in parallel with each other to substantially constitute a single coil.

Figure 7A:
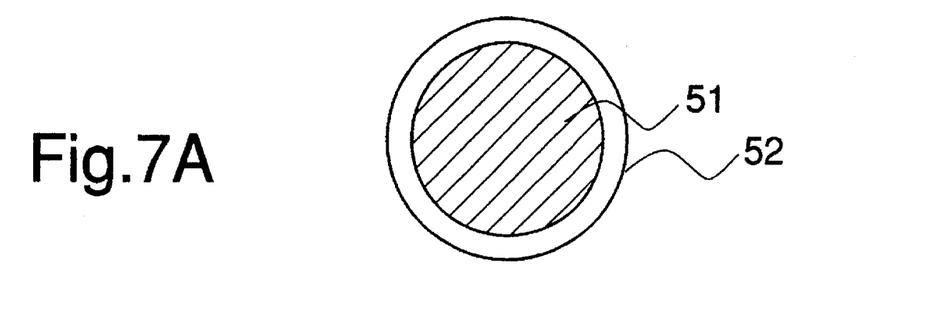
FIGS. 7A to 7D are sectional views showing various sectional shapes of a magnet wire.
Figure 7B:
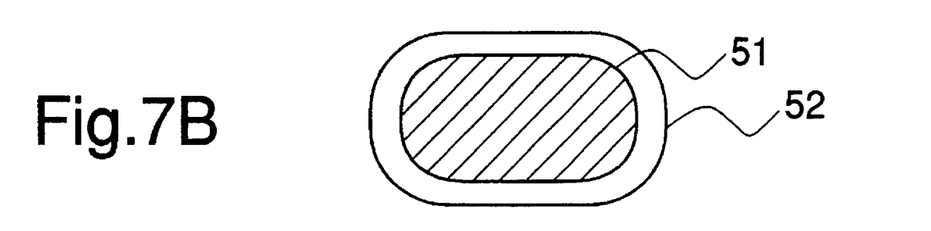
Figure 7C:
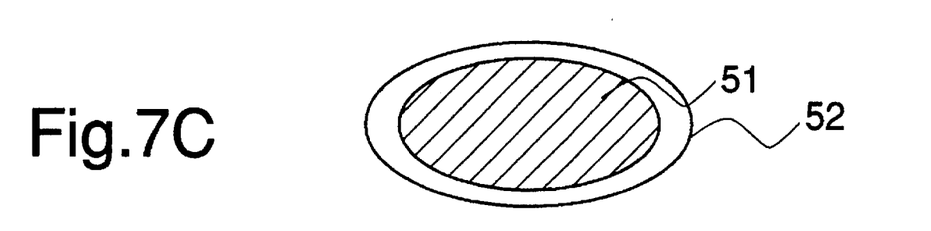
Figure 7D:
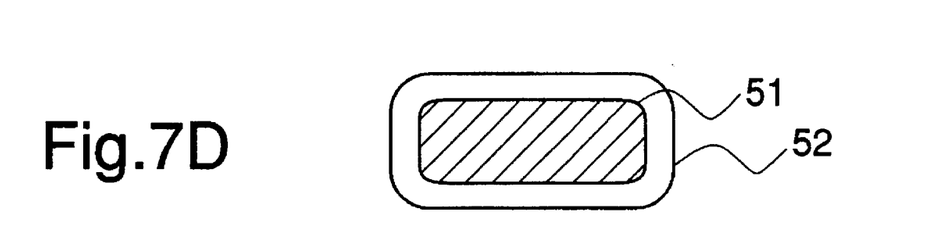

In this embodiment, the magnet wire has a circular section. However, the sectional shape of the coil member according to the present invention is not limited to a circular shape shown in FIG. 7A, but may be an elongated circular shape (FIG. 7B), an elliptic shape (FIG. 7C), or a rectangular shape (FIG. 7D). FIGS. 7A to 7D show examples of various conductor sectional shapes. In FIGS. 7A to 7D, a conductor 51 is covered by an insulating coat 52. In particular, when a coil member of this type adopts a rectangular magnet wire, the space factor can be improved.

Figure 8:
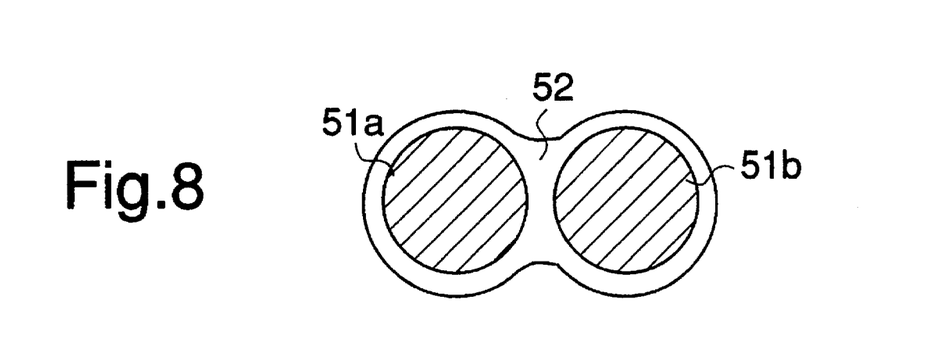
FIG. 8 is a sectional view showing the sectional shape of magnet wires obtained by adhering a plurality of conductive wires side by side.

Also, the magnet wire may be constituted by adhering a plurality of conductor bare wires side by side. FIG. 8 shows an example wherein two conductive bare wires 51a and 51b are adhered to each other via a connecting portion 52. In this case, the sectional shape of the conductive bare wire is not limited to a circular shape but may be an elongated circular shape, an elliptic shape, a rectangular shape, or the like. Also, three or more conductive bare wires may be adhered to each other side by side.

A magnetic field modulation magnetooptical recording apparatus using the magnetic head of the present invention described in the above embodiment will be described below with reference to FIG. 9.

A laser source 101 is continuously turned on by a DC current supplied from a constant current source 106, and a laser beam emitted from the laser source 101 is focused on a magnetic film 100b via an optical system 103. At a portion (spot) irradiated with the laser beam, the temperature increases, and when the temperature exceeds the Curie temperature, reversal of the direction of magnetization can be readily caused. On the other hand, a magnetic head 108 is arranged on a floating slider S, and floats and travels while keeping a space of 10 μm or less between itself and the surface of a magnetooptical disk 100. However, in order to prevent damage to the magnetic film 100b by the floating slider contacting the disk surface or dust attached to the disk surface, a special protective film 100a in which a filler or the like is mixed is formed on the magnetooptical disk 100. Thus, the magnetooptical disk 100 has high durability. The magnetic head 108 receives a current from a magnetic head drive circuit 109, and the direction of a magnetic field generated by the head 108 is reversed in accordance with an information signal. In high-speed information signal recording, since the magnetic head must be rendered compact, and must be brought sufficiently close to the disk, it is desirable that the magnetic head be arranged on the floating slider.

In the magnetic film 100b, the temperature at only the radiation position of the laser beam increases, and magnetization in the same direction as the direction of the magnetic field generated by the magnetic head 108 is formed. Upon rotation of the magnetooptical disk 100, after the spot passes the radiation position of the laser beam, the temperature of the spot immediately decreases, and the formed magnetization is preserved. In this manner, upon reversal of the magnetic field, an information signal is recorded in the magnetic film 100b by a pattern of magnetization regions as large as a laser spot (about 1 μm). This recording system does not require any erasing operation for uniformly aligning the direction of magnetization when the contents of the information signal are to be rewritten, and an overwrite operation can be directly performed over and over by repeating the above-mentioned operation.

Figure 9:
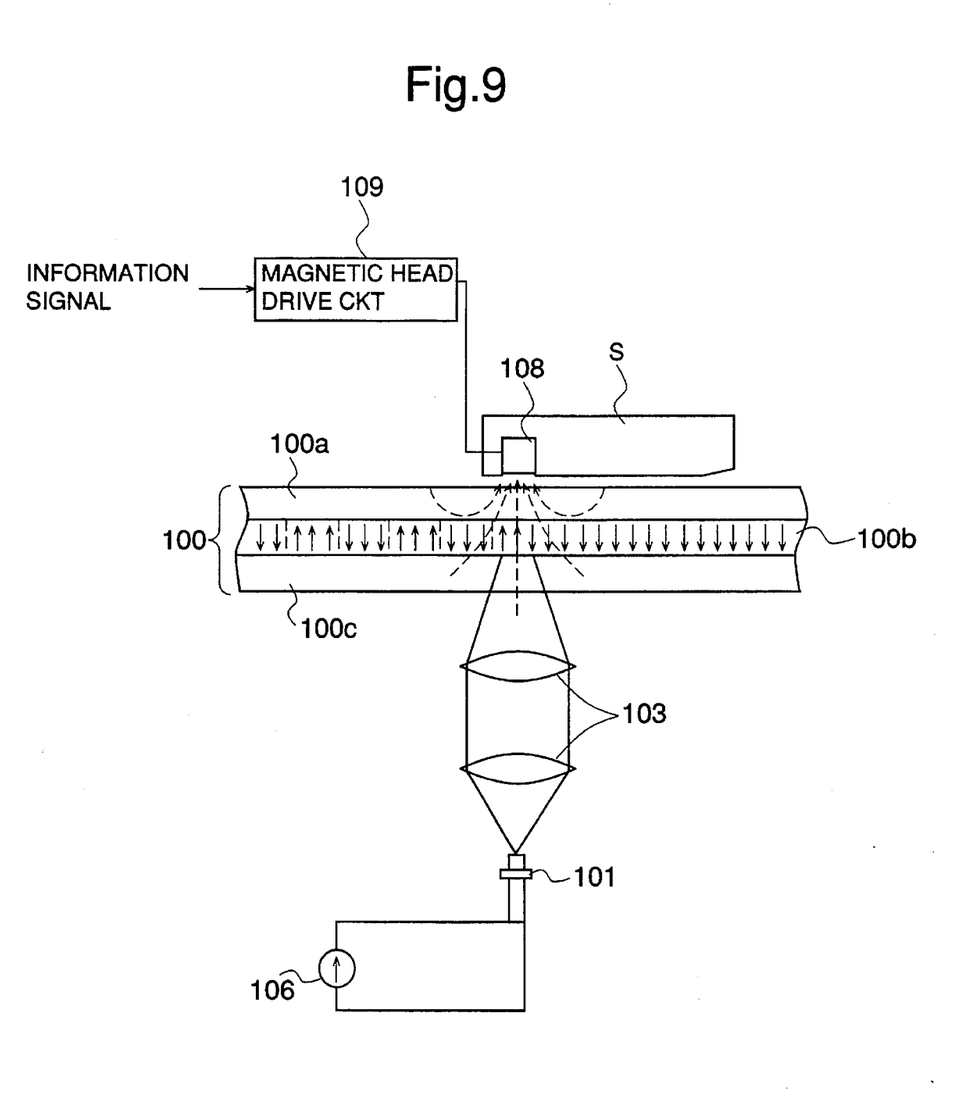
FIG. 9 is a view for explaining a magnetic field modulation magnetooptical recording apparatus using a magnetic head of the present invention.
Figure 10:
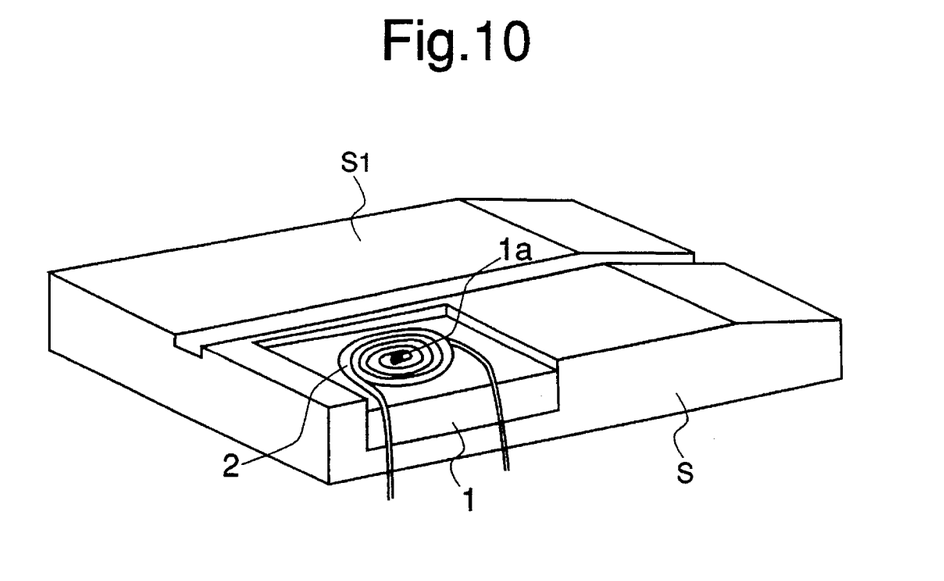
FIG. 10 is a perspective view of a magnetic head structure.
Figure 11:
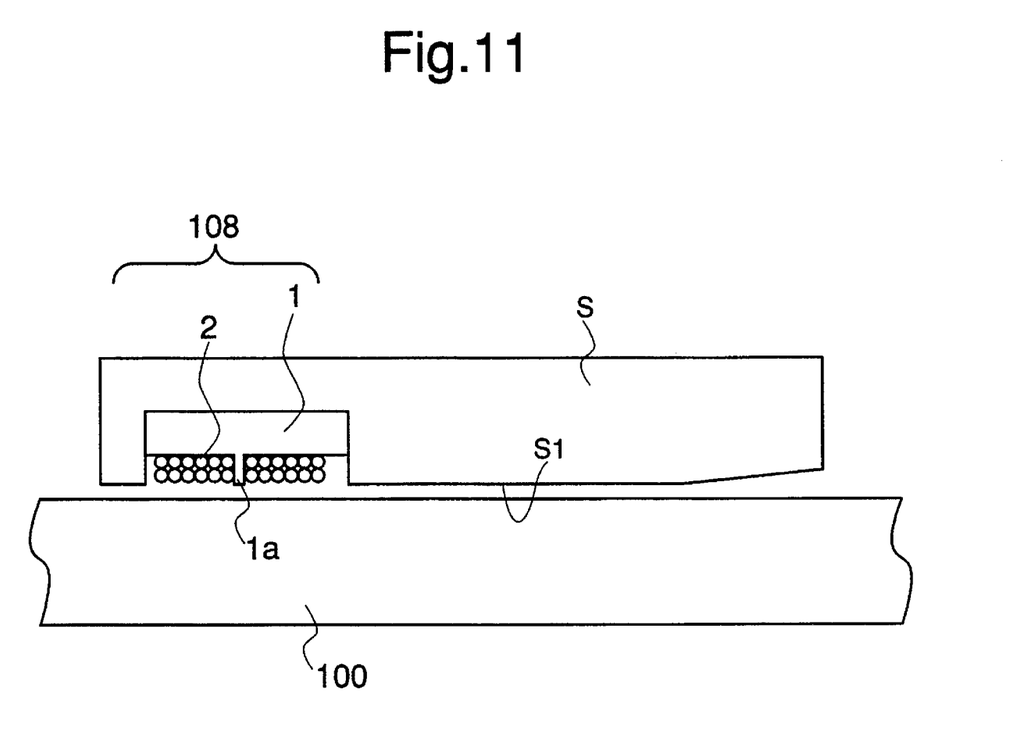
FIG. 11 is a sectional view of the magnetic head structure.

FIGS. 10 and 11 are enlarged views of the magnetic head portion in the apparatus shown in FIG. 9. The magnetic head in this embodiment is a floating magnetic head which is constituted by arranging a magnetic field generation means on the slider S, as shown in FIGS. 10 and 11. The structural feature of this magnetic head is as follows. The substrate 1 consisting of a magnetic material is arranged on a portion, opposing the magnetooptical disk 100, of the slider S, and the magnetic coil 2 is constituted by winding a conductive wire in a spiral pattern by the above-mentioned coil winding method on the magnetic pole 1a on the substrate 1 on a parallel surface recessed from an air bearing surface $S_1$ of the slider S. A modulated magnetic field is generated in the magnetic pole 1a by a current supplied to the magnetic coil 2. In this manner, the two-layered coil is wound around the magnetic pole 1a by the above-mentioned method. Also, a multi-layered coil (the number of layers corresponds to an integer multiple of 2) may be wound, as has been described above with reference to FIGS. 6A to 6D.

When the present invention is applied especially to a magnetic head, the coil may be directly wound around a core of the magnetic head. This arrangement will be described below with reference to FIGS. 12A to 12D. As in the arrangement shown in FIGS. 4A and 4B, one side of a substrate 1 serving as a core is position-restricted by a jig 31 which is used in place of the regulating member 3a or 3b in the above embodiment (FIGS. 3A to 3D), and a coil is wound around a magnetic pole 1a. In this case, since the magnetic pole 1a is sandwiched between the substrate 1 and the jig (regulating member) 31, irregular winding and collapse upon winding of the coil can be prevented.

Figure 12A:
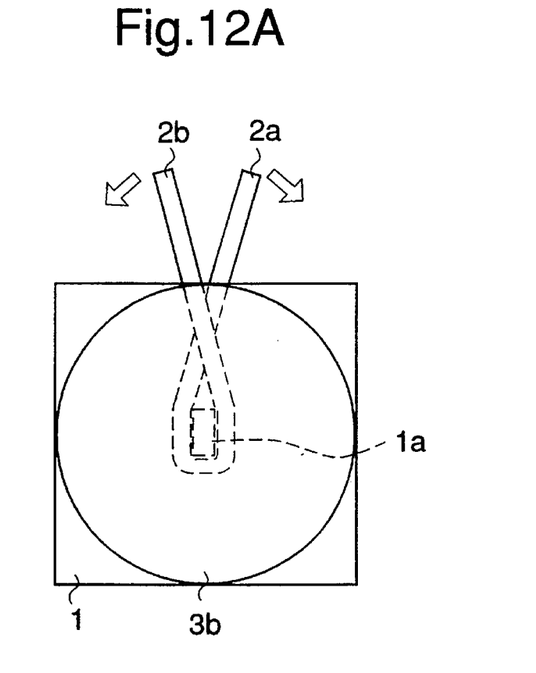
FIGS. 12A to 12D are views showing another embodiment of a magnetic head according to the present invention.
Figure 12B:
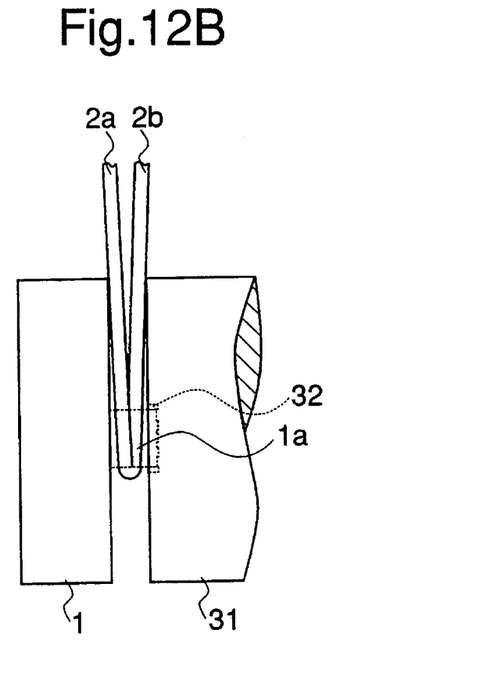

The coil winding method will be described below. FIGS. 12A and 12B respectively show a state viewed from the axial direction and a state viewed from the side surface at the beginning of winding of the coil. The middle portion of the magnet wire is looped around the magnetic pole 1a, and the magnet wire is wound while simultaneously rotating its two end portions 2a and 2b in opposite directions. More specifically, in this embodiment, when viewed from the axial direction of the magnetic pole 1a, as indicated by arrows, the end portion 2a is rotated clockwise, and the end portion 2b is rotated counterclockwise. Furthermore, when the two end portions 2a and 2b cross, they always pass predetermined sides. More specifically, the end portions 2a and 2b cross each other keeping to the left of the other. In this manner, when the magnet wire is sequentially wound around the magnetic pole 1a from the inner periphery side toward the outer periphery side, a two-layered coil is wound.

In this embodiment, the interval between the substrate 1 and the regulating member 31 is determined to substantially coincide with a width twice the diameter of the magnet wire. In order to slightly project the magnetic pole 1a from the upper surface of the coil, a small recess portion 32 may be formed on a portion, opposing the magnetic pole 1a, of the regulating member 31, and the distal end portion of the magnetic pole 1a may be inserted in the upper recess portion 32.

Figure 12C:
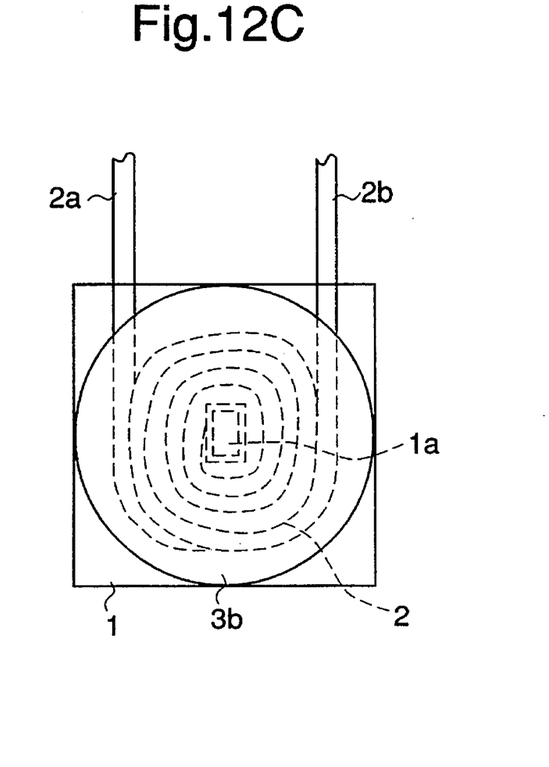
Figure 12D:
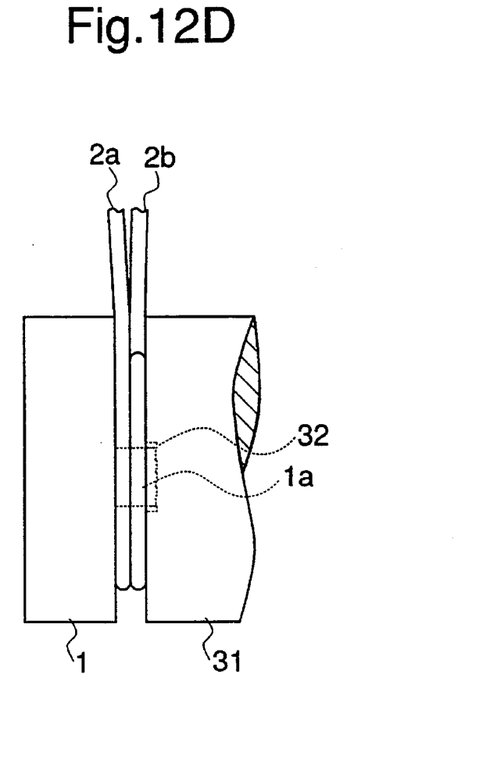

FIGS. 12C and 12D respectively show a state viewed from the axial direction and a state viewed from the side surface at the end of winding of the coil. The wound coil 2 is hardened and adhered to the substrate 1 by a known means. Thereafter, the substrate 1 is detached from the jig. Thus, the same magnetic head as that shown in FIGS. 5A and 5B is completed.

Figure 13:
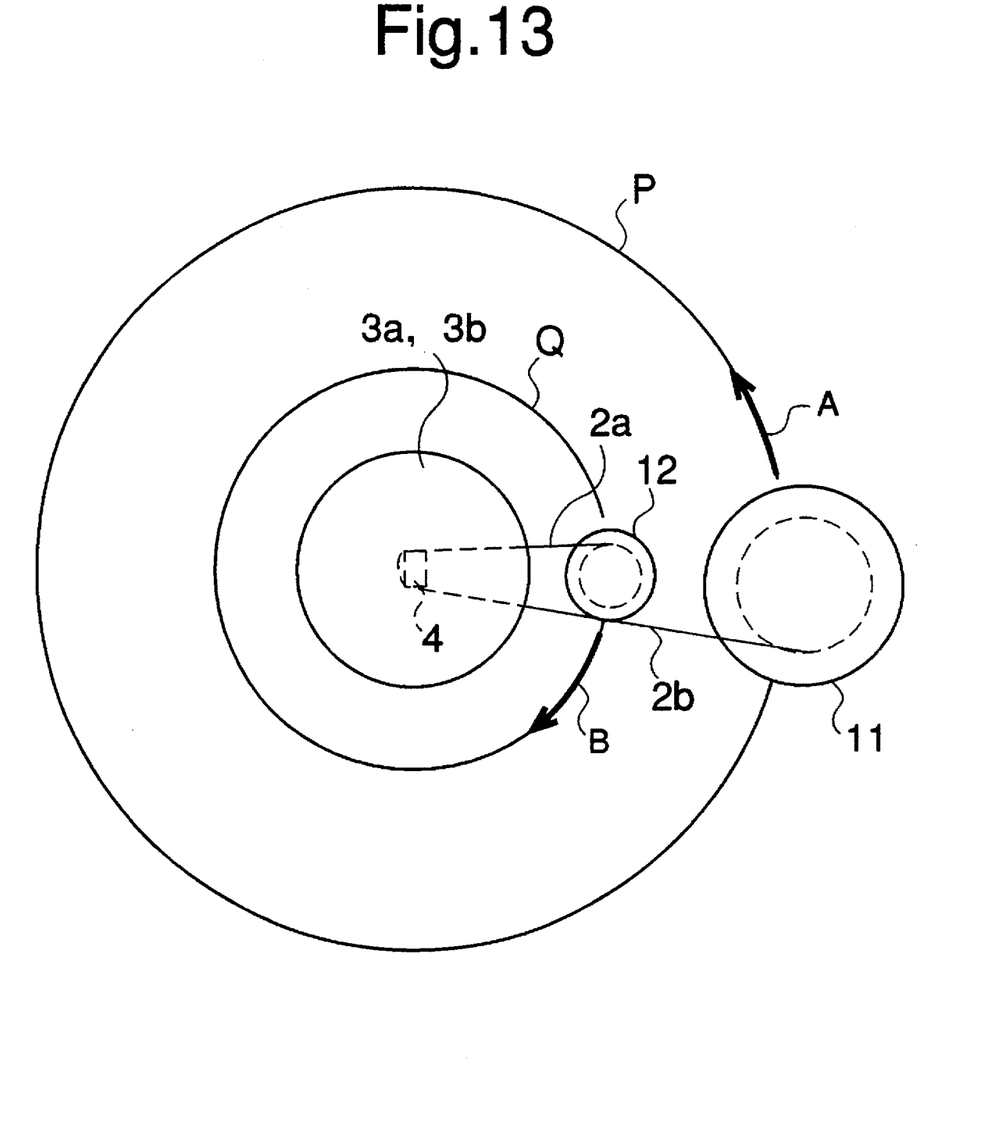
FIG. 13 is a schematic view showing an embodiment of a coil winding device according to the present invention.

An embodiment of a device for realizing the above-mentioned coil winding method will be described below with reference to FIG. 13. A magnet wire used for winding a coil is wound around a bobbin 11. One end of the magnet wire is hooked on a core member 4, and the magnetic wire is taken up in advance on an auxiliary bobbin 11 by a predetermined amount necessary for winding a coil.

Upon winding of a coil, around a jig constituted by the fixed core member 4 and regulating members 3a and 3b, the bobbin 11 runs along a path P in the direction of an arrow A, and at the same time, an auxiliary bobbin 12 runs along a path Q in the direction of an arrow B. Thus, the magnet wire is sequentially wound from the inner periphery side toward the outer periphery side, and a two-layered coil is formed.

Figure 14:
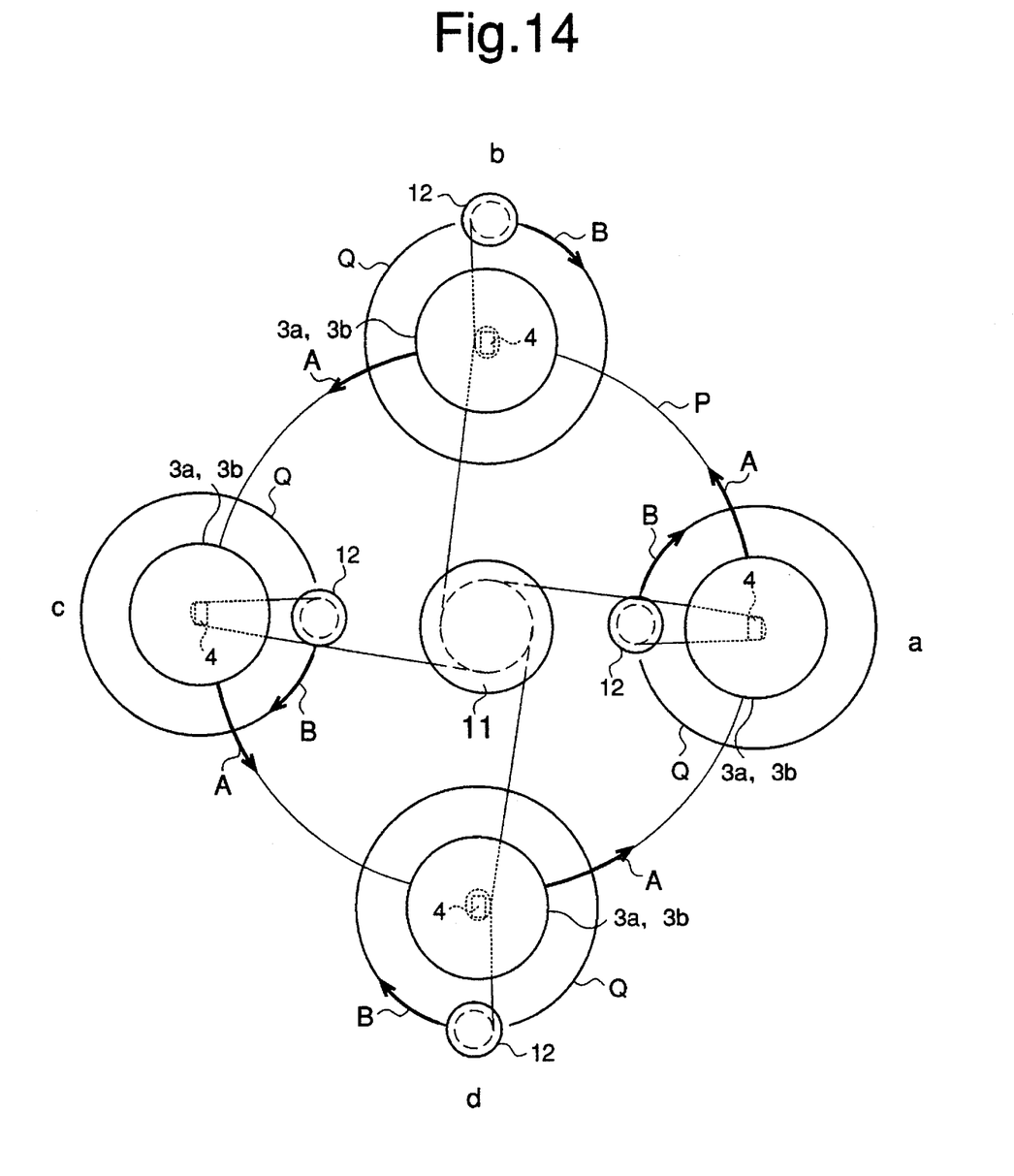
FIG. 14 is a schematic view showing another embodiment of the winding device according to the present invention.

FIG. 14 shows another embodiment of a coil winding device. In this embodiment, a magnet wire to be used for winding a coil is wound around a bobbin 11. One end of the magnet wire is hooked on a core member 4, and the magnetic wire is taken up in advance on an auxiliary bobbin 12 by a predetermined amount necessary for winding a coil. Initially, the positional relationship among the bobbin 11, the auxiliary bobbin 12, and the core member 4 is as indicated by a in FIG. 14.

Upon winding of a coil, a jig constituted by the core member 4 and regulating members 3a and 3b, and the auxiliary bobbin 12 integrally run around the fixed bobbin 11 along a path P in the direction of an arrow A. At the same time, the auxiliary bobbin 12 runs around the jig constituted by the core member 4 and the regulating members 3a and 3b along a path Q in the direction of an arrow B. In this case, the core member 4 itself is not rotated, and is always directed in a predetermined direction. In this manner, a rounding operation starting from the position a and returning thereto via positions b, c, and d is repeated. As a result, the magnet wire is sequentially wound from the inner periphery side toward the outer periphery side, and a two-layered coil is formed.

As described above, when the magnetic head is constituted by arranging the coil manufactured by the coil winding method of the present invention around the magnetic pole on the substrate, no groove for leading a lead wire portion outside the magnetic head is required unlike in the conventional head. Therefore, a magnetic head of this type in which a coil is constituted by two-dimensionally winding a conductive wire on a substrate consisting of a magnetic material requires neither a groove formation process on the substrate nor an insertion process of a lead wire portion in a groove unlike in the manufacture of the conventional magnetic head. Therefore, a magnetic head having a low inductance and a low high-frequency resistance can be manufactured with high productivity, and a recent requirement for a high information signal recording speed can be satisfied.

What is claimed is:

1. A magnetic head comprising:

a base; and a magnetic field generation coil provided on said base and wound in a plane configuration, wherein said coil is wound from its middle portion from an inner periphery toward an outer periphery on said base, while opposite ends of the coil are rotated in opposite directions, so that no recess for accommodating a lead wire drawn from the inner periphery of the coil is provided on said base.

2. A magnetic head according to claim 1, wherein said magnetic field generating coil is arranged as a multi-layered coil, the number of layers being an integer multiple of two.

3. A magneto-optical recording apparatus comprising:

an optical head for radiating a light beam onto a magneto-optical recording medium;

a magnetic head for applying a magnetic field onto the magneto-optical recording medium, said magnetic head comprising a base and a magnetic field generation coil provided in said base and wound in a plane configuration, wherein said coil is wound from its middle portion from an inner periphery toward an outer periphery on said base, while opposite ends of the coil are rotated in opposite directions, so that no recess for accommodating a lead wire drawn from the inner periphery of the coil is provided on said base; and driving means for driving said magnetic head.

4. A magneto-optical recording apparatus according to claim 3, wherein said magnetic field generation coil is arranged as a multi-layered coil, the number of layers being an integer multiple of two.

5. A method of winding a magnetic field generation coil for a magnetic head, comprising the steps of:

arranging a base in which a core member is provided and in which no groove is provided in the vicinity of the core member;

arranging the middle portion of a magnetic field generation coil wound around the core member; and subsequently winding the coil from an inner periphery toward an outer periphery on the base, while rotating opposite ends of the coil in opposite directions.

6. A method according to claim 5, further comprising arranging the magnetic field generation coil as a multi-layered coil, the number of layers being an integer multiple of two.

7. A magnetic head according to claim 1, wherein said magnetic field generation coil is a magnet wire.

8. A magneto-optical recording apparatus according to claim 3, wherein said magnetic field generation coil is a magnet wire.

9. A method according to claim 5, wherein the magnetic field generation coil is a magnet wire.

10. A magnetic field generation coil winding device comprising:

a base provided with a core member and having no groove in the vicinity of the core member; and winding means for winding a magnetic field generation coil around the core member, said winding means arranging the middle portion of the magnetic field generation coil around the core member and subsequently winding the coil from an inner periphery toward an outer periphery on the base, while rotating opposite ends of the coil in opposite directions.

11. A magnetic field generation coil winding device according to claim 10, wherein the magnetic field generation coil is laterally arranged as a multi-layered coil, the number of layers being an integer multiple of two.

12. A magnetic field generation coil winding device according to claim 10, wherein the magnetic field generation coil is a magnet wire.

* * * * *

UNITED STATES PATENT AND TRADEMARK OFFICE
CERTIFICATE OF CORRECTION

PATENT NO. : 5,615,183            Page 1 of 2
DATED : March 25, 1997
INVENTOR(S) : KAZUYOSHI ISHII It is certified that error appears in the above-identified patent and that said Letters Patent is hereby corrected as shown below:

<u>ON THE COVER PAGE</u>

<u>AT ITEM [56] "FOREIGN PATENT DOCUMENTS"</u>

"04181507  6/1992  Japan
      5182112  7/1993  Japan"

should read

--4-181507  6/1992  Japan
    --5-182112  7/1993  Japan--.

<u>COLUMN 3</u>:

Line 50, "constitute" should read --constitutes--.

<u>COLUMN 7</u>:

Line 8, "magnetic" should read --magnet--.

UNITED STATES PATENT AND TRADEMARK OFFICE
CERTIFICATE OF CORRECTION

PATENT NO. : 5,615,183
DATED : March 25, 1997
INVENTOR(S) : KAZUYOSHI ISHII

It is certified that error appears in the above-identified patent and that said Letters Patent is hereby corrected as shown below:

COLUMN 8:

Line 4, "generating" should read --generation--.

Signed and Sealed this

Thirty-first Day of March, 1998

Attest:

BRUCE LEHMAN

Attesting Officer

Commissioner of Patents and Trademarks